United States Patent [19]

Ron

[11] 3,762,492
[45] Oct. 2, 1973

[54] DUAL FLUID SUPPLY CIRCUIT FOR A POWER STEERING AND A HYDRAULIC POWER BRAKE

[76] Inventor: Benjamin Ron, 10 Sanhedrin St., Tel Aviv, Israel

[22] Filed: June 3, 1971

[21] Appl. No.: 149,555

Related U.S. Application Data

[63] Continuation-in-part of Ser. No. 133,316, April 12, 1971, which is a continuation-in-part of Ser. No. 34,143, May 4, 1970.

[52] U.S. Cl. .......... 180/79.2 R, 60/405, 200/81.9 R
[51] Int. Cl. ............................................. B62d 5/06
[58] Field of Search ................ 180/79.2 R; 60/52 S, 60/405, 404; 200/81.9 R

[56] References Cited
UNITED STATES PATENTS

| | | | |
|---|---|---|---|
| 3,434,282 | 5/1969 | Shelhart | 180/79.2 R |
| 3,590,689 | 7/1971 | Brewer | 60/52 S |
| 2,041,726 | 11/1936 | Pray | 200/81.9 R |
| 2,954,671 | 10/1960 | Kress | 60/52 S |
| 3,280,557 | 10/1966 | Sattavara | 60/52 S |
| 3,407,894 | 10/1968 | Thompson | 180/79.2 R X |

FOREIGN PATENTS OR APPLICATIONS

| 262,429 | 9/1967 | Austria | 200/81.9 R |
|---|---|---|---|

*Primary Examiner*—Benjamin Hersh
*Assistant Examiner*—John A. Pekar
*Attorney*—Samuel Shiber

[57] ABSTRACT

An automotive hydraulic circuit containing a power steering and a power brake, a main pump for normally forcing fluid circulation in the hydraulic circuit and an auxiliary pump for forcing the fluid circulation when the main pump fails to discharge sufficient flow.

8 Claims, 7 Drawing Figures

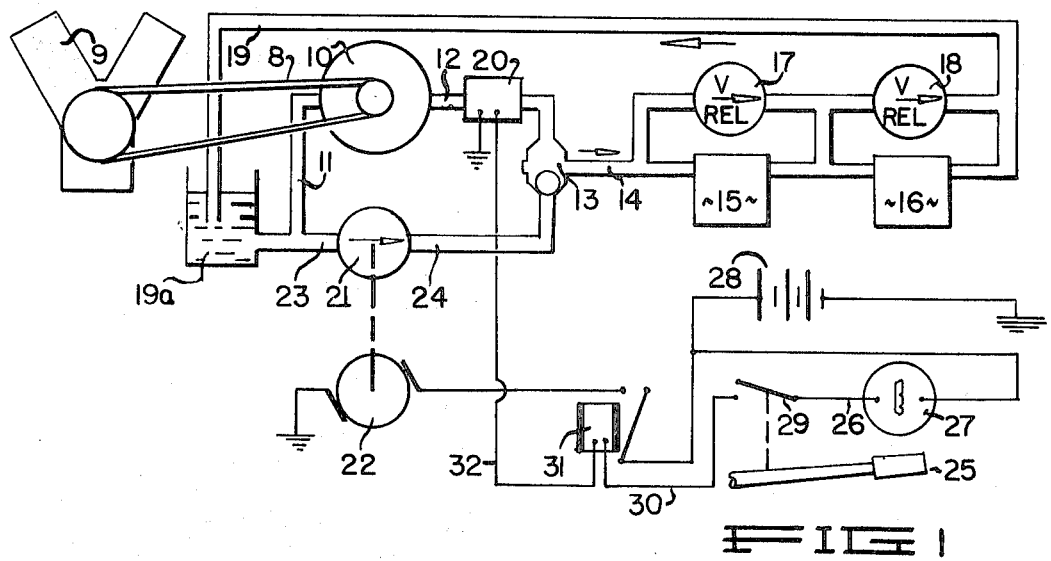
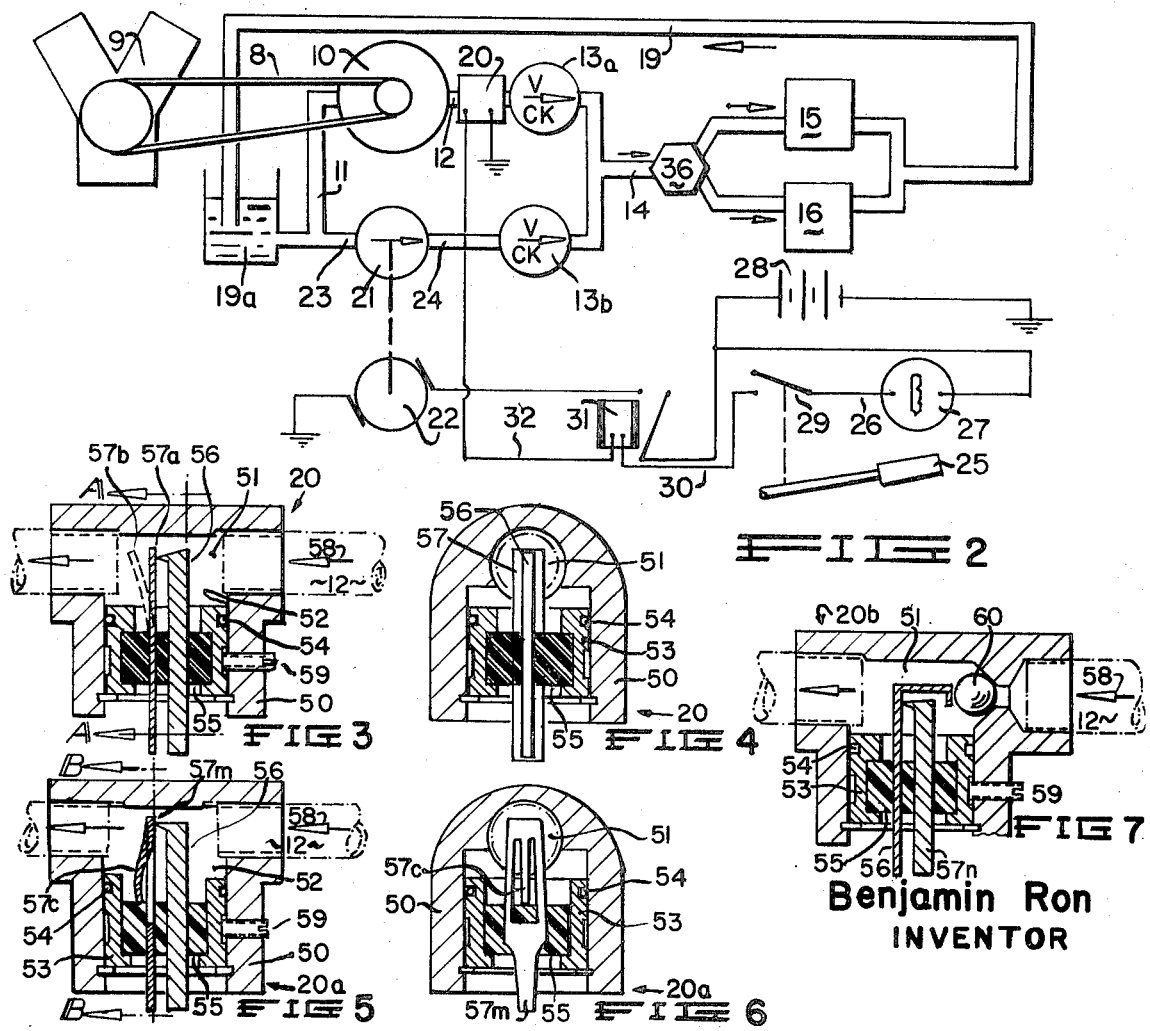

3,762,492

DUAL FLUID SUPPLY CIRCUIT FOR A POWER STEERING AND A HYDRAULIC POWER BRAKE

This application is a continuation-in-part of my copending application titled, "Automotive Hydraulic Safety Circuit For A Power Steering And A Power Brake," filed on Apr. 12, 1971, Ser. No. 133,316, which is a continuation-in-part of my copending application titled "Brake Booster Motor," Ser. No. 34,143, filed May 4, 1970.

BACKGROUND AND SUMMARY

The present invention relates to a hydraulic circuit in a vehicle which contains the following elements; a hydraulic power steering, a hydraulic power brake, a main, normally driven, pump which forces fluid circulation in the hydraulic circuit when the vehicle is operating, and an auxiliary, normally at rest, pump that substitutes the main pump in forcing the fluid circulation when the main pump fails to discharge sufficient flow into the circuit.

This hydraulic circuit has advantages from a safety and economical standpoint. Normally, the main pump is mechanically driven by the vehicle's engine, and serves both the power steering and the power brake as a power source. If for some reason, such as, for example; vehicle's engine stall, or a breakdown in the drive means coupling the main pump to the engine, the main pump fails to force sufficient fluid circulation in the hydraulic circuit, the back-up unit will substitute for the main pump and maintain both the power steering and the power brake operative, allowing the driver to steer the vehicle to a safe stop.

Presently, in a car equipped with conventional power steering and a vacuum power brake booster, when the driver faces a relatively common emergency of an engine stalling while he is in motion, he is suddenly left with no power steering and a very limited number of powered brake applications.

The construction of the various elements of the hydraulic circuit is well known in the art. For example, in my copending applications, titles "Brake Booster Motor" and "Hydraulic Power Brake Booster Motor," Ser. Nos. 34,143 and 80,899 respectively, I show a hydraulic power brake that can be hydraulically coupled in series with a conventional hydraulic power steering and both units are served by a single pump. Other types of power steering and power brake units that can be tied to one pump, either in parallel one to the other or in series, are also known in the art. Suitable pumps of various constructions, such as conventional power steering pumps are currently in a wide commercial usage.

As far as the back-up unit is concerned, it can also be constructed in several ways, for example; a pump coupled to an electric motor could be utilized for this purpose.

BRIEF DESCRIPTION OF THE FIGURES

FIG. 1 schematically shows a hydraulic circuit according to my invention;

FIG. 2 schematically shows a modified form of the hydraulic circuit shown in FIG. 1, FIG. 3 shows a sectional view of a flow switch that can be utilized in the circuit, shown in FIGS. 1 and 2, FIG. 4 shows a cross section of the flow switch shown in FIG. 3, along the line a—a, FIG. 5 shows a sectional view of a modified version of the flow switch shown in FIG. 3, FIG. 6 shows a cross section of the flow switch shown in FIG. 5, along the line b—b, and FIG. 7 shows a sectional view of a flow switch-check valve combination.

DETAILED DESCRIPTION OF THE FIGURES

Throughout the various FIGURES, similar components will be indicated by same numerals:

FIG. 1 schematically shows a hydraulic circuit according to my invention comprising a main, normally driven, pump 10 which is driven by vehicle's engine 9 through a V-belt 8 when the vehicle is operating, having a suction line 11 and a discharge line 12 leading through a shuttle valve 13 to a common discharge line 14, which leads to an open center power steering control valve 15 which is hydraulically coupled in series with an open center hydraulic power brake booster motor 16. A pressure relief valve 17 limits the pressure drop across the power steering control valve 15 and a relief valve 18 limits the pressure drop across the power brake 16.

Numeral 19 indicates a return line leading to a sump 19a.

An auxiliary pump 21, which is coupled to an electric motor 22, has a suction line 23 and a discharge line 24 leading through the shuttle valve 13 to the common discharge line 14.

In vehicles equipped with an automatic transmission, it is recommended that wire 26 will be energized through a vehicle ignition switch 27, when said switch is in both "ON" and "START" positions, from the vehicle's battery 28. A switch 29 is mechanically activated by vehicles gear shift lever 25 so said switch is open when said gear shift lever is in "PARK" position, and is closed when said gear shift lever is in all other positions, such as, for example, "DRIVE" or "REVERSE," etc. When closed, said switch 29 connects the wire 26 to a wire 30 which leads to a relay switch 31.

A flow switch 20 is open as long as the flow rate discharged into the line 12 by the main pump 10 is above a certain level, and it closes when said flow decays below a certain flow rate, (I will refer to this, last mentioned, flow rate as the "triggering flow rate"), connecting the line 32 to a common ground (vehicle's chassis).

The designer may prefer to modify this control circuit, connecting the wire 30 to the wire 26, omitting the switch 29, and allowing the vehicle's ignition switch to energize the wire 26 only when it is in the "ON" position.

Another possible modification is to substitute the flow switch 20 with a pressure switch, however, a flow switch is preferable, for reasons that will become apparent from the following discussion (throughout this discussion arbitrary numerical values will be used for clarification purposes only):

It is possible to sense the failure of the main pump 10 with a pressure switch (which will substitute the flow switch 20), having a certain triggering pressure. If the prevailing fluid pressure in the line 12 will be above this triggering pressure the pressure switch will be open, and when the prevailing fluid pressure in the line 12 is below the triggering pressure the pressure switch is closed.

The shortcomings of this design stems from the fact that this triggering pressure should be below the lowest fluid pressure that may prevail in the line 12 during normal operation of the main pump 21. Assuming that the fluid in the circuit is oil, and that it is hot, and that neither the power steering 15 nor the power brake 16 are in use, the prevailing pressure may drop to 10 p.s.i. in the line 12. Therefore, the triggering pressure would be 5 p.s.i., for example:

If the vehicle's engine will stall, the pressure in the line 12 will decay and cause the pressure switch to close and activate the auxiliary pump. However, if the engine stalls while the power steering 15 and/or the power brake 16 are in use, the prevailing pressure in line 12, at the instant the vehicle's engine stalled may have been several hundred p.s.i. Under these conditions, especially if the oil in the circuit happens to be cold, it may take several seconds for the pressure in the line 12 to decay below the triggering pressure, causing an undesirable delay in the activation of the auxiliary pump 21.

Another limitation of this sensing arrangement is that it may fail to sense a partial failure of the main pump 10. Assuming that the main pump 10 is designed to discharge a minimum of 1 gallon per minute at a 1,000 p.s.i. into the line 12, if the V-belt 8, has become untensioned, or contaminated with oil, under load, that is, when the pump is called to deliver fluid at high pressure, slippage in this V-belt may develop causing the main pump's discharge to drop to zero at 500 p.s.i. However, since 500 p.s.i. is well above the triggering pressure, the pressure switch will remain open and the auxiliary pump 21 will remain at rest.

Excessive internal leakage in the main pump can also cause a similar type of partial failure, that will also go undetected, if the flow switch 20 is substituted with a pressure switch.

Therefore, a preferable sensing means would be the flow switch 20, which is open when the prevailing flow in the line 12 is above a certain flow, which is, for example, one-half gallon per minute, and is closed when the prevailing flow in line 12 is below this flow rate. This sensing means will respond almost instantaneously to either full or partial failure of the main pump 10.

FIG. 2 shows a basically similar arrangement to the one shown in FIG. 1, the difference being that the power steering control valve 15 and the power brake 16 are arranged hydraulically in parallel to one another, and a flow devider 36 assures that both units receive part of the flow passing the common discharge line 14. Also the shuttle valve 13 that was used to block the flow between the main pump 10 and the auxiliary pump 21 has been replaced, in FIG. 2, by check valves 13a and 13b which accomplish the same function.

FIG. 3 shows a flow switch 20 having a switch housing 50 which defines a passsge 51 and a bore 52 perpendicular to it. The bore 52 contains a sleeve 53 carrying a seal 54 and containing a plastic plug 55 which supports a solid metal strip 56 and a flexible metal strip 57.

The solid metal strip's end 56a is bent and sharpened to normally make an electrical contact with the end 57a of the flexible strip when the flow rate that is passed in this passage 51 is below the triggering flow, and to break contact when the flow level through the passage 51 is above this triggering flow. This will occur due to the bending of the flexible strip 57 to the position shown in a phantom line and indicated by numeral 57b, due to the dynamic pressure of the flow passing the passage 51 in the direction indicated by arrows 58.

The triggering flow can be varied by loosening a screw 59 and rotating the solid and flexible strips 56 and 57 together with the sleeve and plug assembly to a position which will reduce the effective face area of the flexible strip 57 that is exposed to the flow in the passage 51.

FIG. 4 shows a cross section of the flow switch shown in FIG. 3 along the line a—a for clarification purposes.

FIG. 5 shows a sectional view of a switch 20a with a flexible strip indicated by numeral 57M. The object of this modification is to cause the strip's end to snap from the position 57a to the position 57b. Such a feature may be desired in order to increase to the current carrying capacity of the flow switch or in order to create a hysteresis range between the flow rate that opens the flow switch to the flow rate that allows the flow switch to close (triggering flow).

FIG. 6 shows a cross section of the flow switch shown in FIG. 5, along the line b—b. A buckled leg portion 57c, of the flexible strip 57M is used as an over center spring means, causing the snapping action of the flexible strip between the positions 57a and 57b.

FIG. 7 shows a flow switch-check valve combination, having a housing 20b, and containing a ball 60, normally seated in a funnel shaped valve seat defined by said housing 20b, blocking any flow in a direction opposed to the arrows 58. However, if sufficient flow passes the flow switch-check valve in the direction of the arrows 58, the ball 60 is urged leftwards opening the contact between the solid strip 56 and the flexible strip 57n.

This flow switch-check valve combination has a positive switching action, and it can be used, for example, to replace the flow switch 20 and check valve 13a shown in FIG. 2.

OPERATION

In reference to the embodiment shown in FIG. 1 or FIG. 2, when the driver enters his car in order to drive it, he starts the vehicle's engine. The rotating engine drives the main pump 10, raising the flow in the line 12 and opening the flow switch 20. As the driver shifts the gear lever from its "PARK" position, the switch 29 becomes closed connecting the wire 26 to the wire 30.

Now, if for some reason, such as, the vehicle's engine stalling or, breakage or slippage of the V-belt 8, the pump 10 fails to force sufficient fluid flow through the line 12, the flow switch 20 will close, activating the relay 31 which activates the motor 22, which in turn activates the pump 21.

The pump 21, under these conditions, will substitute for the main pump 10, forcing fluid flow through both the power steering control valve 15 and through the hydraulic brake booster motor 16.

While a limited number of embodiments of the present invention have been shown and described, it is to be understood that variations thereof are included within the spirit of the invention and scope of the following claims.

I claim:

1. A dual fluid supply circuit for a fluid recirculating mechanism having a fluid inlet and outlet, comprising, a main normally driven pump and an auxiliary normally at rest pump each having a fluid discharge and return line, means connecting said discharge lines to said inlet, and said return lines to said outlet of said mechanism, first control means in said lines blocking the flow of fluid between said pumps, and means including flow sensing means, in said main pump's discharge line, being operably connected to said auxiliary pump, for automatically activating said auxiliary pump in response to a predetermined decay in the fluid flow discharge of said main pump.

2. A dual fluid supply circuit as in claim 1, said flow sensing means comprising;
   a switch housing defining a fluid flow passage,
   a first, flexible, electrically conductive member supported by said switch housing at one end, and having its other end exposed to a fluid flow passing through said fluid flow passage, said flexible member making and breaking an electrical contact with a second electrically conductive member in response to variations of said fluid flow.

3. A dual fluid supply circuit as in claim 1 where said first control means comprise a shuttle valve.

4. A dual fluid supply circuit as in claim 1 where said first control means comprise a plurality of check valves.

5. A fluid supply circuit as in claim 1, said first control means comprising a check valve in said discharge line of said auxiliary pump, and a flow switch-check valve combination in the discharge line of said main pump, said flow switch-check valve combination which also serve as said flow sensing means, comprising;
   a switch housing defining a fluid flow passage, said fluid flow passage containing a sealing element for allowing flow through said fluid flow passage in one direction only, said sealing element causing making or breaking an electrical contact in response to the flow rate through said fluid flow passage.

6. A dual fluid supply circuit as in claim 1 where said fluid recirculating mechanism is a hydraulic power brake.

7. A dual fluid supply circuit as in claim 1 where said fluid recirculating mechanism is a power steering.

8. A dual fluid supply circuit for a hydraulic power brake and a power steering comprising;
   a main, normally driven pump for normally supplying fluid to said hydraulic power brake and said power steering, an auxiliary normally at rest pump for supplying fluid to said hydraulic power brake and said power steering upon failure of said main pump, lines for hydraulically connecting said main and auxiliary pumps to said hydraulic power brake and said power steering, first control means in said lines blocking the flow of fluid between said pumps, and means including flow sensing means, in said discharge line of said main pump operably connected to said auxiliary pump, for automatically activating said auxiliary pump in response to a predetermined decay in the flow discharged by said main pump.

* * * * *